United States Patent
Lindoff et al.

(10) Patent No.: US 10,314,050 B2
(45) Date of Patent: Jun. 4, 2019

(54) SMALL BANDWIDTH CELL CONFIGURATION, FOR REDUCING INTERFERENCE WITH OVERLAPPING LARGE BANDWIDTH CELL

(71) Applicant: Telefonaktiebolaget LM Ericsson (publ), Stockholm (SE)

(72) Inventors: Bengt Lindoff, Bjarred (SE); Bo Hagerman, Tyreso (SE); Stefan Parkvall, Bromma (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 79 days.

(21) Appl. No.: 15/523,393

(22) PCT Filed: Nov. 3, 2014

(86) PCT No.: PCT/EP2014/073601
§ 371 (c)(1),
(2) Date: Apr. 30, 2017

(87) PCT Pub. No.: WO2016/070903
PCT Pub. Date: May 12, 2016

(65) Prior Publication Data
US 2017/0245288 A1    Aug. 24, 2017

(51) Int. Cl.
*H04W 4/00* (2018.01)
*H04W 72/08* (2009.01)
(Continued)

(52) U.S. Cl.
CPC ......... *H04W 72/082* (2013.01); *H04L 5/0048* (2013.01); *H04W 16/10* (2013.01);
(Continued)

(58) Field of Classification Search
None
See application file for complete search history.

(56) References Cited

U.S. PATENT DOCUMENTS

2010/0054237 A1*  3/2010  Han ................. H04J 3/0638
                                              370/350
2011/0216842 A1  9/2011  Zhang et al.
(Continued)

OTHER PUBLICATIONS

PCT International Search Report, dated Jun. 30, 2015, in connection with International Application No. PCT/EP2014/073601, all pages.
(Continued)

*Primary Examiner* — Bob A Phunkulh
(74) *Attorney, Agent, or Firm* — Leffler Intellectual Property Law, PLLC

(57) ABSTRACT

A method is disclosed of a network node of a cellular communication system for configuring a first cell of the cellular communication system in relation to a second cell of the cellular communication system. A coverage area of the first cell and a coverage area of the second cell overlap, at least partly. The first cell is to be provided by a first base station of the cellular communication system and has a first bandwidth and the second cell is provided by a second base station of the cellular communication system and has a second bandwidth which is larger than the first bandwidth. The method comprises determining an offset between a first carrier frequency of the first cell and a second carrier frequency of the second cell and configuring the first base station to provide the first cell based on the first carrier frequency. A first spectrum range defined by the first carrier frequency and the first bandwidth is comprised within a second spectrum range defined by the second carrier frequency and the second bandwidth. The offset is determined such that control signaling of the second cell is aligned with control signaling of the first cell to reduce an impact of interference between the control signaling of the first cell and the control signaling of the second cell. Corresponding computer program product, arrangement and network node are also disclosed.

16 Claims, 4 Drawing Sheets

(51) Int. Cl.
*H04L 5/00* (2006.01)
*H04W 16/10* (2009.01)
*H04W 72/04* (2009.01)
*H04W 16/12* (2009.01)
*H04W 84/04* (2009.01)

(52) U.S. Cl.
CPC ......... *H04W 16/12* (2013.01); *H04W 72/042* (2013.01); *H04W 72/0406* (2013.01); *H04W 84/042* (2013.01)

(56) References Cited

U.S. PATENT DOCUMENTS

| | | | |
|---|---|---|---|
| 2011/0317645 A1 | 12/2011 | Jen | |
| 2013/0039195 A1* | 2/2013 | Weng | H04W 48/20 370/252 |
| 2013/0115965 A1* | 5/2013 | Xu | H04W 72/04 455/450 |
| 2013/0188624 A1 | 7/2013 | Lee | |
| 2013/0242880 A1* | 9/2013 | Miao | H04L 5/001 370/329 |
| 2013/0343372 A1* | 12/2013 | Whinnett | H04W 56/0015 370/344 |
| 2013/0344878 A1* | 12/2013 | Whinnett | H04W 56/001 455/450 |
| 2014/0080475 A1* | 3/2014 | Gholmieh | H04W 48/16 455/422.1 |
| 2014/0194133 A1 | 7/2014 | Darwood et al. | |

OTHER PUBLICATIONS

PCT Written Opinion, dated Jun. 30, 2015, in connection with International Application No. PCT/EP2014/073601, all pages.

3GPP TS 36.211 Version 11.6.0 Release 11, Oct. 2014,, LTE; Evolved Universal Terrestrial Radio Access (E-UTRA); Physical channels and modulation, 122 pages.

* cited by examiner

SMALL BANDWIDTH CELL CONFIGURATION, FOR REDUCING INTERFERENCE WITH OVERLAPPING LARGE BANDWIDTH CELL

TECHNICAL FIELD

The present invention relates generally to the field of cellular communication systems. More particularly, it relates to configuration of cells of cellular communication systems.

BACKGROUND

In emerging wireless communication concepts (e.g. the $5^{th}$ generation cellular communication standard advocated by the Third Generation Partnership Project—3GPP), one application considers support of machine-type communication (MTC). A MTC device may typically transmit small amounts of data at each transmission occasion and the transmission occasions may be quite rare.

According to some scenarios, the support for MTC should provide for radio resource management that allows coexistence between different classes of applications, for example, applications with sporadic, small amounts of MTC data along with applications with real-time data.

Also typically, a MTC device may be a low cost device, which may entail that it cannot support all requirements of some wireless communication standards. For example, UMTS-LTE (Universal Mobile Telecommunication Standard, Long Term Evolution) is designed for broadband data rates (>10 Mb/s) and correspondingly applies wide spectrums for communication, which may not be possible to support with a low cost modem.

Thus, there is a need for methods and devices that enable accommodation of MTC devices in coexistence with broadband communication.

A possible solution comprises providing a separate (narrow) spectrum for MTC. However, this may not be a spectrum efficient solution, especially during introduction and ramp-up of MTC when the number of MTC devices will be rather low, since the separate spectrum (which could otherwise be used for ordinary communication) will typically not be fully exploited by the MTC.

Thus, there is a need for alternative methods and devices that enable accommodation of MTC devices in coexistence with broadband communication.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof.

It is an object of some embodiments to obviate at least some of the above disadvantages and to provide spectrum efficient methods and devices that enable accommodation of MTC devices in coexistence with broadband communication.

According to a first aspect, this is achieved by a method of a network node of a cellular communication system. The method is for configuring a first cell of the cellular communication system in relation to a second cell of the cellular communication system, wherein a coverage area of the first cell and a coverage area of the second cell at least partly overlap. The first cell is to be provided by a first base station of the cellular communication system and has a first bandwidth, and the second cell is provided by a second base station of the cellular communication system and has a second bandwidth which is larger than the first bandwidth.

The method comprises determining an offset between a first carrier frequency of the first cell and a second carrier frequency of the second cell, and configuring the first base station to provide the first cell based on the first carrier frequency.

A first spectrum range defined by the first carrier frequency and the first bandwidth is comprised within a second spectrum range defined by the second carrier frequency and the second bandwidth.

The offset is determined such that control signaling of the second cell is aligned with control signaling of the first cell to reduce an impact of interference between the control signaling of the first cell and the control signaling of the second cell.

For example, the offset may be determined such that control signaling of the second cell is aligned with control signaling of the first cell to reduce an impact of interference compared to if no offset is used.

The first and second base station may be the same or different base stations.

The second bandwidth may, typically, be substantially larger than the first bandwidth. For example, the first bandwidth may be 1.4 MHz and the second bandwidth may be 10-20 MHz.

The offset may be a non-zero offset according to some embodiments.

In some embodiments, the first and second carrier frequencies may be different.

Determining the offset may be equivalent to controlling the offset according to some embodiments.

In various embodiments, the first or second carrier frequency may be fixed when the method is carried out and the other carrier frequency may be defined by the offset. Alternatively, both of the first or second carrier frequency may be variable when the method is carried out and their relation is defined by the offset.

Configuring the first base station to provide the first cell may simply comprise configuring the first cell if the method is carried out by the first base station. If the method is carried out by another network node (e.g. a centralized server node or scheduler) configuring the first base station to provide the first cell may comprise transmitting an indication of the first carrier frequency to the first base station.

Reducing the impact of interference may comprise reducing the impact of interference compared to an average of the impact of interference if the offset was chosen randomly or with no offset.

Determining the offset such that control signaling of the second cell is aligned with control signaling of the first cell to reduce an impact of interference between the control signaling of the first cell and the control signaling of the second cell may comprise various approaches according to various embodiments.

In some embodiments, the offset may be determined based on a number of time-frequency resources (e.g. resource elements) used for control signaling of the second cell within the first spectrum range. For example, an offset resulting in a minimum number of such time-frequency resources may be selected among all possible offset values.

In some embodiments, the offset may cause an amount of control signaling of the second cell within the first spectrum range to be minimized (or at least reduced compared to an average amount of control signaling of the second cell within the first spectrum range if the offset was chosen randomly).

Control signaling may, for example, comprise control channels, synchronization channels, pilot channels, etc. Typically control signaling may comprise any non-data signaling, as applicable.

According to some embodiments, an amount of the control signaling of the second cell within the first spectrum range may be defined based on a cell identity of the second cell, and the offset may be determined based on the cell identity of the second cell.

If the method is carried out by another network node than the second base station (e.g. a centralized server node or scheduler) the method may also comprise receiving the cell identity of the second cell from the second base station.

In some embodiments, the method may further comprise determining a cell identity of the first cell based on the cell identity of the second cell, wherein the cell identity of the first cell is determined such that an amount of the control signaling of the first cell that coincides with the control signaling of the second cell minimized (or at least reduced compared to an average amount of the control signaling of the first cell that coincides with the control signaling of the second cell if the cell identity of the first cell was chosen without considering the cell identity of the second cell), and configuring the first base station to provide the first cell may be further based on the cell identity of the first cell.

The cellular communication system may, for example, be compliant with UMTS-LTE (Universal Mobile Telecommunication Standard, Long Term Evolution, UMTS-LTE, e.g. Rel-8 and beyond). The control signaling of at least one of the first cell and the second cell may comprise one or more of: Physical Downlink Control CHannel (PDCCH), Physical Control Format Indicator CHannel (PCFICH), Physical Hybrid-ARQ CHannel (PHICH) and Cell-specific Reference Symbols (CRS).

According to some embodiments, the method may further comprise determining a need for data communication of the first cell during a particular time interval, determining a time-frequency resource to be used by the control signaling of the first cell to convey a radio resource allocation in the particular time interval for the data communication of the first cell, preventing the control signaling of the second cell from using the time-frequency resource, and transmitting the control signaling of the first cell that conveys the radio resource allocation.

In some embodiments, the method may further comprise increasing a redundancy of the control signaling of the second cell. Increasing the redundancy may, for example, comprise altering a coding applied to the control signaling of the second cell, increasing a number of control channel elements (CCE) used for the control signaling of the second cell, etc.

In some embodiments, the redundancy may be increased for the control signaling of the second cell relating to data communication of the second cell during the particular time interval.

A second aspect is a computer program product comprising a computer readable medium, having thereon a computer program comprising program instructions. The computer program is loadable into a data-processing unit and adapted to cause the data-processing unit to execute method steps according to the first aspect when the computer program is run by the data-processing unit.

A third aspect is an arrangement for a network node of a cellular communication system. The arrangement is for configuring a first cell of the cellular communication system in relation to a second cell of the cellular communication system, wherein a coverage area of the first cell and a coverage area of the second cell at least partly overlap. The first cell is to be provided by a first base station of the cellular communication system and has a first bandwidth, and the second cell is provided by a second base station of the cellular communication system and has a second bandwidth which is larger than the first bandwidth. The arrangement comprises a processor adapted to perform (or at least cause performance of) method steps according to the first aspect.

A fourth aspect is an arrangement for a network node of a cellular communication system. The arrangement is for configuring a first cell of the cellular communication system in relation to a second cell of the cellular communication system, wherein a coverage area of the first cell and a coverage area of the second cell at least partly overlap. The first cell is to be provided by a first base station of the cellular communication system and has a first bandwidth, and the second cell is provided by a second base station of the cellular communication system and has a second bandwidth which is larger than the first bandwidth.

The arrangement comprises a carrier frequency offset determiner adapted to determine an offset between a first carrier frequency of the first cell and a second carrier frequency of the second cell and a cell configurer adapted to configure the first base station to provide the first cell based on the first carrier frequency A first spectrum range defined by the first carrier frequency and the first bandwidth is comprised within a second spectrum range defined by the second carrier frequency and the second bandwidth.

The offset is determined such that control signaling of the second cell is aligned with control signaling of the first cell to reduce an impact of interference between the control signaling of the first cell and the control signaling of the second cell.

The arrangement may further comprise a cell identity determiner adapted to determine a cell identity of the second cell according to some embodiments. The carrier frequency offset determiner may be adapted to determine the offset based on the cell identity of the second cell which defines an amount of the control signaling of the second cell within the first spectrum range.

In some embodiments, the cell identity determiner may be further adapted to determine a cell identity of the first cell based on the cell identity of the second cell, wherein the cell identity of the first cell is determined such that an amount of the control signaling of the first cell that coincides with the control signaling of the second cell is reduced. The cell configurer may be further adapted to configure the first base station to provide the first cell based on the cell identity of the first cell.

The arrangement may further comprise a scheduler according to some embodiments. The scheduler may be adapted to determine a need for data communication of the first cell during a particular time interval, determine a time-frequency resource to be used by the control signaling of the first cell to convey a radio resource allocation in the particular time interval for the data communication of the first cell, prevent the control signaling of the second cell from using the time-frequency resource, and cause a transmitter of the first base station to transmit the control signaling of the first cell that conveys the radio resource allocation.

A scheduler may, for example, be a unit that allocates resources and redundancy coding in a time-frequency domain.

The scheduler may be further adapted to increase a redundancy of the control signaling of the second cell according to some embodiments. For example, the scheduler may be adapted to increase the redundancy for the control signaling of the second cell relating to data communication of the second cell during the particular time interval.

A fifth aspect is a network node comprising the arrangement according to any of the third and fourth aspects. The network node may be a base station or a scheduler node according to some embodiments.

In some embodiments, the third, fourth and fifth aspects may additionally have features identical with or corresponding to any of the various features as explained above for the first aspect.

An advantage of some embodiments is that accommodation of MTC devices in coexistence with broadband communication is enabled.

Another advantage of some embodiments is that spectrum efficiency is provided even if the number of MTC devices is low.

Thus, according to some embodiments, a spectral efficient solution is provided for introduction of a small bandwidth cellular system part (focusing on low cost MTC devices, e.g. sensors). This is particularly beneficial if there is a heavy asymmetry in capacity demands between broadband users and MTC devices. By overlaying a cell used for MTC and a broadband cell such that the carrier frequency of the cell used for MTC is chosen as a function of the cell identity of the broadband cell, the impact of colliding control channels can be minimized (or at least reduced). Furthermore, by coordinating the scheduling mechanism for the two cells, any remaining collisions can be mitigated by adapting the power control and/or by adapting which resources are used for the control channels (e.g. PDCCH).

BRIEF DESCRIPTION OF THE DRAWINGS

Further objects, features and advantages will appear from the following detailed description of embodiments, with reference being made to the accompanying drawings, in which.

DETAILED DESCRIPTION

In the following, embodiments will be described where a first cell with relatively small bandwidth (suitable for low cost MTC devices) is overlaid a second cell with relatively large bandwidth (suitable for other devices, e.g. a UMTS-LTE cell). Overlaying may refer to that the small bandwidth spectrum range of the first cell is completely (or at least partly) comprised within the large bandwidth spectrum range of the second cell. Furthermore, the coverage areas of the first and second cell may typically overlap (at least partly).

The carrier frequency of the first cell, and hence the placement of the small bandwidth spectrum of the first cell in frequency, is selected based on the cell identity of the second cell. The selection comprises placing the small bandwidth spectrum where it will not be interfered by control signaling of the second cell (or where it will be interfered by control signaling of the second cell to an acceptable degree). For example, the selection may comprise finding a frequency range corresponding to the small bandwidth spectrum range within the large bandwidth spectrum range of the second cell where there is no (or a minimum amount of) control signaling of the second cell.

The cell identity of the first cell, and hence location of control signaling of the first cell, may also be selected based on the cell identity of the second cell according to some embodiments. This selection provides for the control signaling of the first cell to be located where it will not be interfered by control signaling of the second cell (or where it will be interfered by control signaling of the second cell to an acceptable degree).

Figure 1:
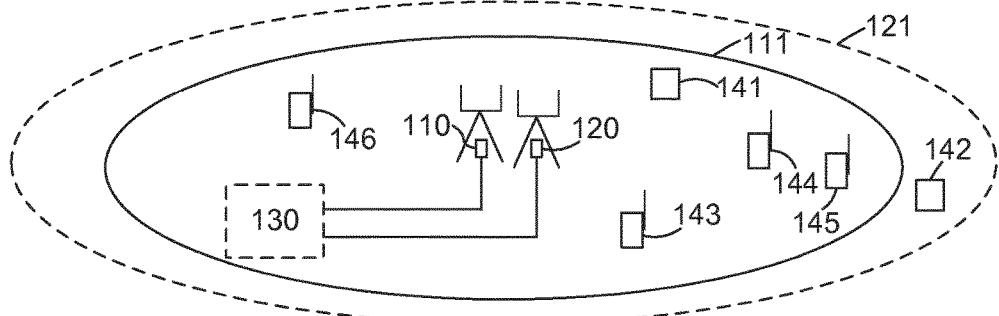
FIG. 1 is a schematic drawing illustrating an example scenario according to some embodiments.

FIG. 1 illustrates an example scenario where some embodiments may be applicable. In this scenario there are a plurality of MTC devices 141, 142 and a plurality of broadband wireless communication devices 143, 144, 145, 146 present within a certain geographical area. A first cell 121 with a relatively small bandwidth is provided for the MTC devices by a base station 120 and a second cell 111 with a relatively large bandwidth is provided for the broadband wireless communication devices by a base station 110. The base stations 110 and 120 may be implemented as a single base station, as separate co-located base stations, or as separate non-co-located base stations. In some scenarios, the base stations 110 and 120 may be connected to a centralized node 130, e.g. comprising a scheduler.

Figure 2:
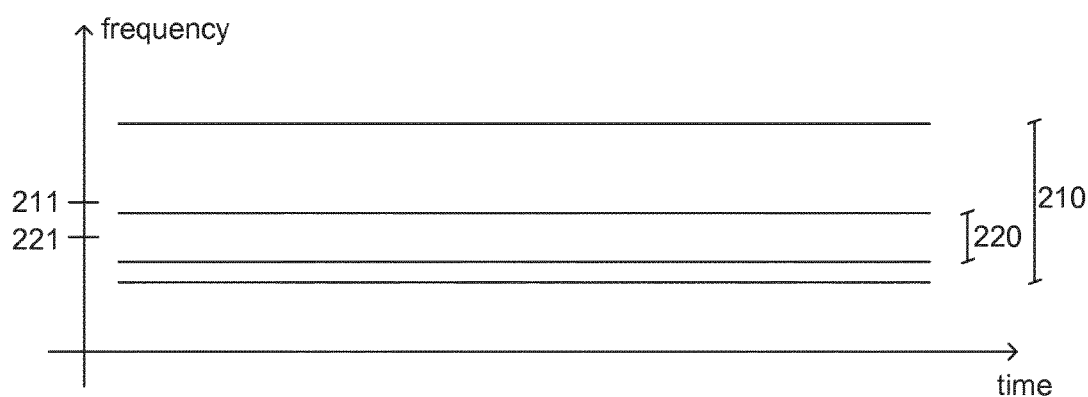
FIG. 2 is a schematic drawing illustrating an example frequency allocation according to some embodiments.

FIG. 2 illustrates how the small bandwidth spectrum 220 of the first cell may be completely comprised within the large bandwidth spectrum 210 of the second cell and how the carrier frequency 221 of the first cell is offset compared to the carrier frequency 211 of the second cell.

Figure 3:
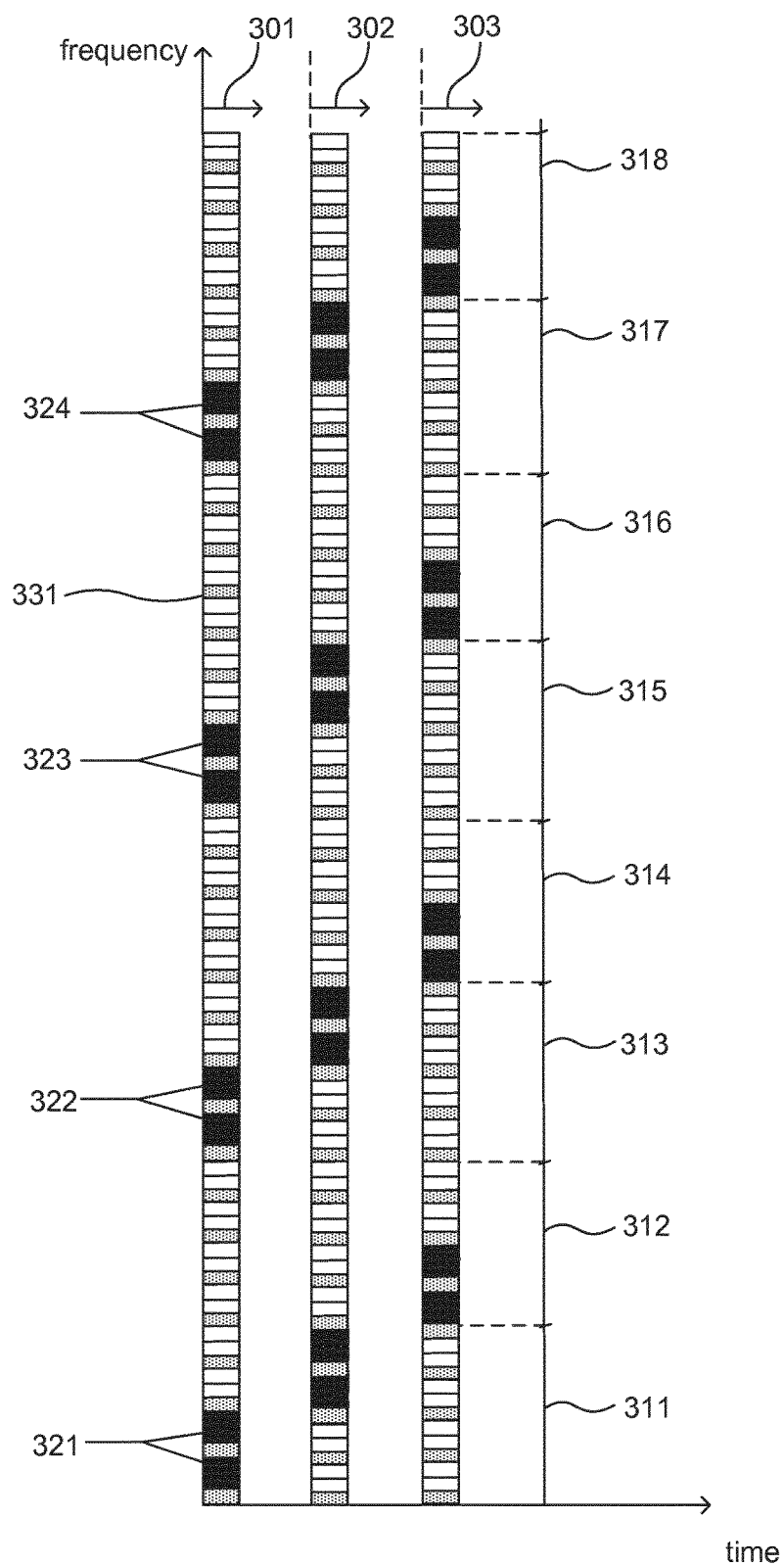
FIG. 3 is a schematic drawing illustrating an example time-frequency allocation according to some embodiments.

FIG. 3 schematically illustrates a typical time-frequency allocation of the second cell according to UMTS-LTE. The time-frequency space is divided into subframes 301, 302, 303 and resource blocks (RB) 311, 312, 313, 314, 315, 316, 317, 318. Black resource elements (e.g. 321, 322, 323, 324) denote PCFICH, the placement of which is typically a function of the cell identity, and dotted resource elements (e.g. 331) denote resources reserved for CRS (common reference signals). It should be noted that only part of each subframe is shown in FIG. 3.

Figures 4, 5:
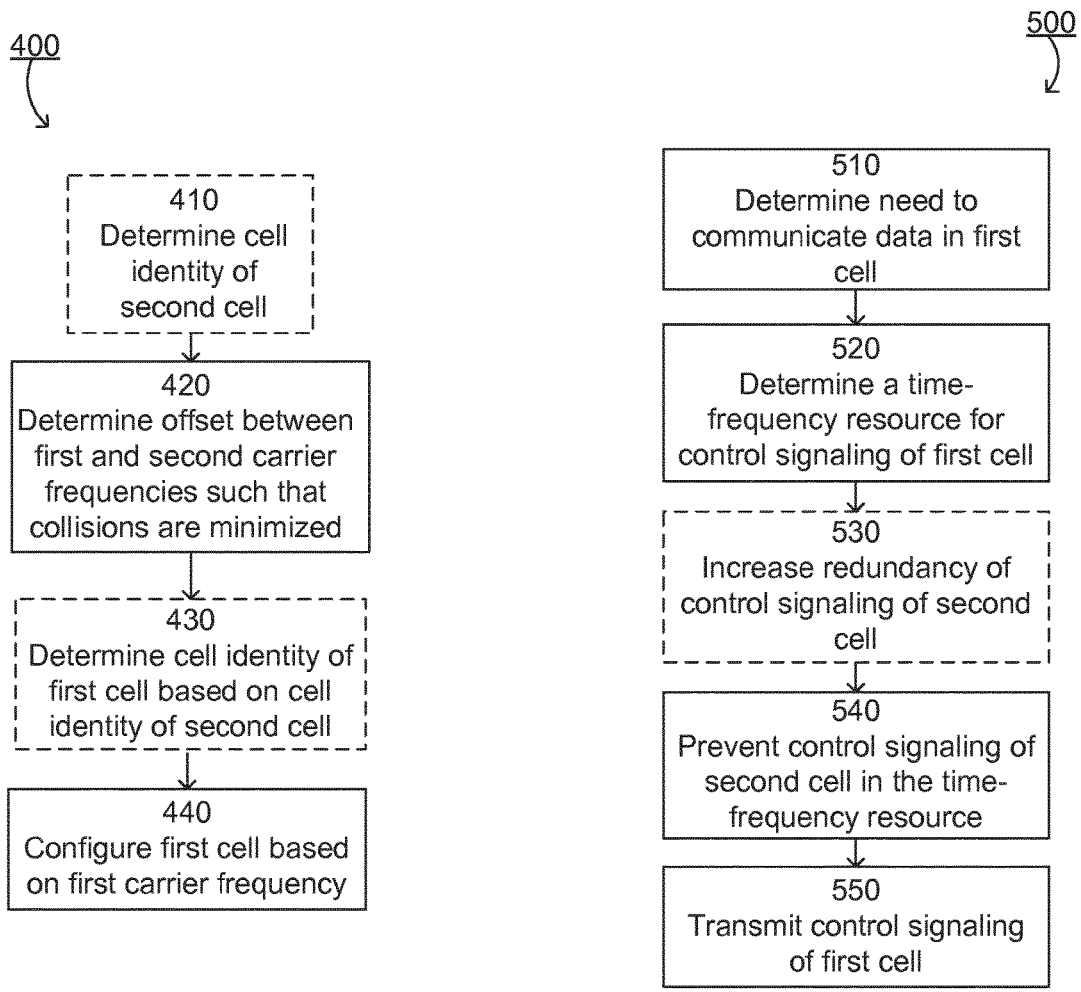
FIG. 4 is a flowchart illustrating example method steps according to some embodiments.
FIG. 5 is a flowchart illustrating example method steps according to some embodiments.

FIG. 4 is illustrates an example method 400 according to some embodiments. The method may be carried out by a network node (e.g. a base station, a centralized server node, a scheduler, etc.) of a cellular communication system.

The method starts in step 410 where the cell identity of a cell (the second cell) with relatively large bandwidth is determined. In some embodiments, this cell identity is already known (e.g. if the method is carried out by the base station providing the second cell) and step 410 may be discarded. In other embodiments, step 410 may, for example, comprise receiving information about the cell identity of the second cell (e.g. if the method is carried out by another node than the base station providing the second cell).

In some embodiments, step 410 may also comprise determining the carrier frequency of the second cell.

If the bandwidth of the first cell is variable, the bandwidth to use may be determined prior to step 420. Such a determination may, for example, be based on the foreseen traffic load of the first cell.

In step 420, an offset between the carrier frequency of the second cell and a carrier frequency of another cell (the first cell) with relatively small bandwidth is determined based on the cell identity of the second cell. The offset is determined such that the small bandwidth spectrum is (at least partly) comprised in the large bandwidth spectrum, and the determination of the offset aims at minimizing (or at least reducing) collision between communication (e.g. control signaling) of the first cell and control signaling of the second cell. Thus, the offset is determined such that control signaling of the second cell (the location of which depends on the cell identity of the second cell) is aligned with control signaling of the first cell to reduce an impact of interference between the control signaling of the first cell and the control signaling of the second cell.

For example, the carrier frequency of the first cell may be chosen such that collision with PCFICH (and possibly PCHICH) of the second cell is (at least substantially) avoided.

In optional step 430, a cell identity of the first cell may also be determined based on the cell identity of the second cell. The cell identity of the first cell may be determined such that an amount of the control signaling of the first cell (the location of which depends on the cell identity of the first cell) that coincides with the control signaling of the second cell is reduced.

For example, the cell identity of the first cell may be chosen such that collision between CRSs (and/or other pilot signals) on the first and second cells is (at least substantially) avoided.

A base station is then configured to provide the first cell based on the carrier frequency determined in step 420, and possibly also based on the cell identity determined in step 430.

Step 440 may simply comprise configuring the first cell if the method is carried out by the base station that is to provide the first cell. If the method is carried out by another network node (e.g. another base station, a centralized server node, a scheduler node, etc.) step 440 may comprise transmitting an indication of the first carrier frequency and/or a configuration instruction to the base station that is to provide the first cell.

FIG. 5 illustrates an example method 500 according to some embodiments. The method may be carried out by a network node (e.g. a base station, a centralized server node, a scheduler, etc.) of a cellular communication system. In some embodiments, the example method 500 is carried out after or in conjunction with the example method 400 of FIG. 4.

The method 500 starts in step 510 where it is determined that there is a need to communicate data in the first cell (for example, MTC data) and one or more time-frequency resources are determined in step 520 for transmission of control signaling relating to the data of step 510 (e.g. PDCCH resource elements). The data may be uplink or downlink data. The need for transmission may, for example, be in a particular subframe. The control signaling may, for example, comprise radio resource allocations for the data of step 510.

For example, a scheduler may determine to which device(s), served by the second cell, it is suitable to allocate data in the same subframe as used for the communication of the first cell. The device(s) are chosen such that the impact of scheduling data to them and the devices of the first cell is mutually reduced, e.g. as exemplified above. A PDSCH/PUSCH region may then be determined for the chosen device(s) of the second cell in the subframe (e.g. resource blocks that do not collide with resource blocks allocated to the first cell).

In optional step 530, a redundancy of control signaling of the second cell is increased (e.g. by increasing a number of control channel elements (CCE) of the control signaling).

For example, based on the determination regarding which users to schedule in the second cell and their respective received CQIs (channel quality indicators), it may be determined how many CCE the PDCCH of the second cell needs (taking into account possible need for nulling of PDCCH resource elements, see step 540). This typically means that the amount of CCE used is increased compared to the need determined based on the PDCCH type and downlink signal quality (CQI) reported (e.g. 4 CCE instead of 2, 8 CCE instead of 4, etc.).

In step 540, control signaling (e.g. PDCCH resource elements) of the second cell is prevented from using the time-frequency resource(s) of step 520.

The redundancy increase of step 530 may mitigate negative effects caused by the prevention of step 540 on the control signaling of the second cell.

Then, the control signaling of the first cell is transmitted in step 550 overlaid on transmissions of the second cell. Typically, step 550 may comprise transmitting the relevant subframe for the first and second cells overlaid.

Figure 6:
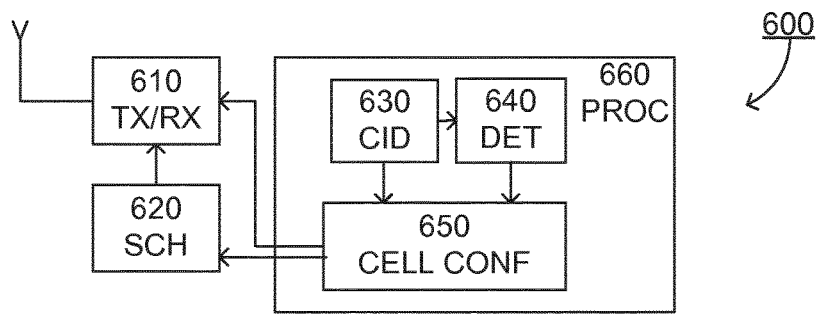
FIG. 6 is a block diagram illustrating an example arrangement according to some embodiments.

FIG. 6 schematically illustrates an example arrangement 600 according to some embodiments. The arrangement 600 may, for example, be comprised in a network node of a cellular communication system (e.g. a base station).

The arrangement 600 may, for example, be adapted to perform one or more of the methods as described in connection to FIGS. 4 and 5.

The arrangement comprises a determiner (DET) 640 comprising a carrier frequency offset determiner. The determiner is adapted to determine an offset between a carrier frequency of the first cell and a carrier frequency of the second cell based on the cell identity of the second cell (read from a cell identity unit (CID) 630) as explained above (compare with step 420 of FIG. 4).

The determiner 640 may also comprise a cell identity determiner adapted to determine a cell identity of the first cell based on the cell identity of the second cell as explained above (compare with step 430 of FIG. 4).

The arrangement also comprises a cell configurer (CELL CONF) 650 adapted to configure the first cell based on the determined carrier frequency (and possibly also based on the cell identity of the first cell, compare with step 440 of FIG. 4), either directly (e.g. via a scheduler (SCH) 620) if the arrangement is comprised in the base station that is to provide the first cell, or by transmitting (via a transceiver (TX/RX) 610) an indication of the carrier frequency of the first cell and/or a configuration instruction to the base station that is to provide the first cell if the arrangement is comprised in another network node.

The scheduler 620 may be adapted to determine a need for data communication of the first cell (compare with step 510 of FIG. 5), determine a time-frequency resource to be used by related control signaling of the first cell (compare with step 520 of FIG. 5), prevent the control signaling of the second cell from using the time-frequency resource (compare with step 540 of FIG. 5), and cause a transmitter (transceiver 610) to transmit the control signaling of the first cell (compare with step 550 of FIG. 5). The scheduler may also be adapted to increase the redundancy of the control signaling of the second cell as explained above (compare with step 530 of FIG. 5).

One or more of the determiner 640, the cell identity unit 630, the cell configurer 650, and the scheduler 620 may be implemented as functions of a processor (PROC) 660.

Figure 7:
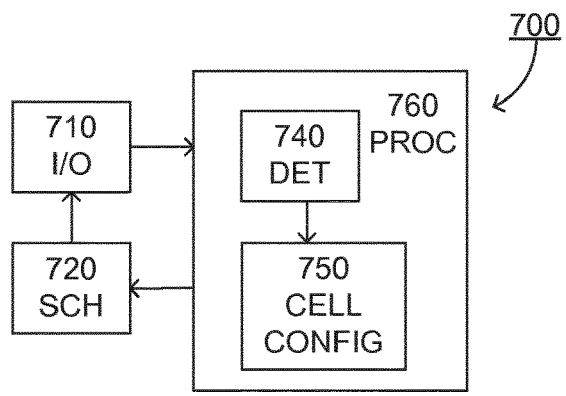
FIG. 7 is a block diagram illustrating an example arrangement according to some embodiments.

FIG. 7 schematically illustrates an example arrangement 700 according to some embodiments. The arrangement 700 may, for example, be comprised in a network node of a cellular communication system (e.g. a centralized scheduler node).

The arrangement 700 may, for example, be adapted to perform one or more of the methods as described in connection to FIGS. 4 and 5.

The arrangement comprises a determiner (DET) 740 comprising a carrier frequency offset determiner. The determiner is adapted to determine an offset between a carrier frequency of the first cell and a carrier frequency of the second cell based on the cell identity of the second cell (received via an input/output port (I/O) 710) as explained above (compare with step 420 of FIG. 4).

The determiner 740 may also comprise a cell identity determiner adapted to determine a cell identity of the first cell based on the cell identity of the second cell as explained above (compare with step 430 of FIG. 4).

A scheduler (SCH) 720 is adapted to control transmissions of one or more base stations.

The arrangement also comprises a cell configurer (CELL CONF) 750 adapted to cause configuration of the first cell based on the determined carrier frequency (and possibly also based on the cell identity of the first cell, compare with step 440 of FIG. 4) by transmitting (via the input/output port (I/O) 710) an indication of the carrier frequency of the first cell and/or a configuration instruction to the base station that is to provide the first cell.

The scheduler 720 may also be adapted to determine a need for data communication of the first cell (compare with step 510 of FIG. 5), determine a time-frequency resource to be used by related control signaling of the first cell (compare with step 520 of FIG. 5), prevent the control signaling of the second cell from using the time-frequency resource (compare with step 540 of FIG. 5), and cause a transmitter (transceiver 610) to transmit the control signaling of the first cell (compare with step 550 of FIG. 5). The scheduler may also be adapted to increase the redundancy of the control signaling of the second cell as explained above (compare with step 530 of FIG. 5).

One or more of the determiner 740, the cell configurer 750, and the scheduler 720 may be implemented as functions of a processor (PROC) 760.

Thus, according to some embodiments, a method is provided for introducing a (first) cell (or, equivalently, a first carrier) for a small bandwidth system (using any suitable access technique, e.g. according to UMTS-LTE, Global System for Mobile communication—GSM, IEEE 802.11x, Sigfox, Bluetooth, etc.) overlaid on a (second) cell for a wider bandwidth system (e.g. using UMTS-LTE).

The network nodes (e.g. base stations, eNodeB) providing the first and second cells may be co-located (e.g. they may be the same network node) and controlled by the same scheduler in the network node. Non-co-located scenarios also are possible.

The overlay may be such that the impact of the first cell on the second cell is minimized. For example, the carrier frequencies of the first and second cells are typically offset as a function of the second cell physical cell ID (PCI). Since the PCI determines the position of different control channels (PHICH and PCFICH) in UMTS-LTE, the carrier frequency of the first cell may be chosen such that the impact of collision of control and data on the first and second cell is minimized.

Furthermore, the configuration of the first cell (e.g. the first cell ID if the first cell uses UMTS-LTE) may also be chosen as a function of the second physical cell ID in order to further reduce the impact of collision of data and control of the two cells.

Scheduling and power control principles may also be adapted to avoid (or at least reduce) the impact of colliding data and control channels for the two cells.

Separate or joint base station (eNodeB) power amplifier (PA) resources may be used for the two cells.

Dynamic sharing of the spectrum resources is enabled according to some embodiments, since the full bandwidth can be used for the large bandwidth cell in time intervals (e.g. subframes) where the small bandwidth cell is not transmitting.

Example embodiments will now be given where a small bandwidth (1.4 MHz, 6 resource blocks) UMTS-LTE (substantially Release-8) cell is overlaid a large bandwidth (10 or 20 MHz) UMTS-LTE cell.

Referring back to FIG. 1, a scenario where the approaches presented herein may be particularly useful is an asymmetric scenario where there are a large amount of mobile broadband users 143, 144, 145, 145 served by a wideband (10 or 20 MHz) cell 111 and a just a few low-cost devices 141, 142 served by a small bandwidth cell 121. In fact, in some scenarios there may be many low-cost devices 141, 142 but since they typically transmit very little data and/or vary seldom, the total amount of traffic is very small compared to the mobile broadband traffic relating to the mobile broadband users 143, 144, 145, 145.

The small bandwidth cell 121 may have extended coverage range compared to the large bandwidth cell 111 as illustrated in FIG. 1. This is due to that the entire (or most of) the wideband power amplifier resources can be allocated to the narrowband cell carrier when transmitting in the small bandwidth cell if a joint PA is used. The same effect may be accomplished by having a dedicated PA per cell where the narrowband cell carrier is designed for extended coverage range.

As elaborated in above, the system bandwidth of the first cell is overlaid a subset of the system bandwidth of the second cell, and the carrier frequency for the first cell is selected as a function of the cell identity (ID) of the second cell. Typically, the carrier frequency of the first cell may be chosen based on some properties of the second cell that results in a minimum amount of collisions between the two cells of particularly necessary signaling (i.e. control channels, sync signals, pilot signals).

For example, assuming an UMTS-LTE Rel-8 1.4 MHz MTC cell, the only signals/channels that actually need to be transmitted at all times are PSS/SSS (primary/secondary synchronization signals), PBCH (Physical Broadcast CHannel), some SIB (System Information Block) and some CRS (Common Reference Signal) while the control channels (PCFICH, Physical Downlink Control CHannel—PDCCH, Physical Hybrid-ARQ CHannel—PHICH) may be muted in subframes when there is no allocation of traffic to devices in the first cell. In some embodiments, (a maximum amount of) MBSFN (multicast-broadcast single-frequency network) subframes may be used in the first cell to reduce the amount of subframes where the second cell needs to schedule in a manner that takes the first cell into account.

By offsetting the carrier frequency of the first cell from the middle 6 resource blocks (RB) in the second cell, collision may be avoided between the first and second cell sync signals and broadcast information (which is transmitted in the middle 6 resource blocks in UMTS-LTE regardless of the system bandwidth).

Furthermore, by selecting the carrier frequency and the cell ID for the first cell wisely once the cell ID for the second cell is known, collision may be avoided for the CRS as well. Hence, the approach above may be suitable also for TDD (Time Division Duplex, e.g. time synchronized systems where there is a need for time aligned subframes).

The cell ID in UMTS-LTE determines in which resource elements (RE) the PCFICH and PHICH are transmitted. Hence, by utilizing this information, the carrier frequency for the first cell may be determined such that the first cell does not collide with the PCFICH in cell 1 (see e.g. FIG. 3 and 3GPP TS36.211, section 6.7.4). Looking into the 3GPP specification details (see e.g. 3GPP TS36.211, sections 6.7 and 6.9) it is possible to find at least 6 resource blocks (in fact, 9 or more resource blocks for bandwidths ≥10 MHz) where there are no crucial signaling and the small bandwidth first cell can be placed. The location of these "empty" resource blocks (leading to the carrier frequency of the first cell) depends on the physical cell ID of the second cell (at least if lowest amount to PHICH groups is assumed, which is a parameter that may be configured by eNodeB, see e.g. 3GPP36.211, section 6.9).

One possible approach for a scheduler to create a "hole" in a subframe of the second cell, in which the first cell may transmit, may comprise one or more of:

Avoid scheduling PDSCH in the second cell on the resource blocks used by the first cell. This may be straightforwardly achieved by coordinating the scheduling decisions in the two cells.

Avoid (or at least reduce) transmitting PDCCH in the second cell on the resource blocks used by the first cell. This can be achieved by reducing the amount of traffic in the second cell (in the particular subframe) in order to reduce the amount of PDCCHs needed (unused PDCCHs are typically not transmitted) and/or by selecting users and PDCCH aggregation levels in the second cell that have minimum collision with the resource blocks used for the first cell. Using an overly high aggregation level for a user in the second cell can, in addition to providing increased robustness, avoid the resource blocks used by the first cell since the location of the resource elements used by a PDCCH varies with the aggregation level.

Avoid (or at least reduce) transmitting PHICH in the second cell on resource blocks used by the first cell. The amount and location of PHICHs used in a subframe depend on the uplink traffic in the second cell (scheduled a few subframes earlier) and can thus be controlled by the appropriate uplink scheduling and configuration in the second cell.

Similar approaches may be used in the uplink. In subframes where uplink of the first cell is scheduled, the corresponding uplink resources are blanked (i.e. not scheduled) in the second cell.

Some form of coordination between the first and the second cell is typically needed in terms of scheduling. Furthermore, some basic parameters (e.g. carrier frequency and/or cell identity) may also need to the coordinated between the two cells. The two cells may be operated by the same or by different network nodes as mentioned above.

If the two cells are transmitted from the same node, coordinating the scheduling decisions is straightforward. One possibility is to implement a joint scheduler handling both cells, which provides very tight coordination and allows frequent changes regarding which subframes are available for the second cell. Transmitting the two cells from the same node also allows that the two cells share the same power amplifier, antenna equipment, etc. MTC support could in this case (at least if UMTS-LTE is used for both cells) be done through a simple upgrade of the software in an existing UMTS-LTE base station. Configuration parameters such as cell identity (ID) of the second cell are, in this case, typically set by an O&M (operations and maintenance) system in the same way as if there was no first cell. The cell identity of the first cell (if applicable) is either set by the O&M system or derived in the node handling the cells based on the cell ID of the second cell.

If the two cells are transmitted from different nodes, coordination is more complex. Typically, some form of coordination message(s) need to be exchanged between the network nodes. Such messages may, for example, convey (at least) information regarding the resources in the time domain (e.g. subframes) and in the frequency domain (e.g. resource blocks) that need to be coordinated. The coordination functionality may be implemented in the node handling the second cell, the node handling the first cell, a third node (e.g. an O&M node, a coordination node, etc.), or a combination of two or more of these alternatives. Typically, the frequency location of the resources used for the first node does not change over time (at least not very often), but are linked to the (fixed) cell ID of the second cell. A change in frequency location of the first cell would basically imply that the first cell is restarted. The time location (e.g. which subframes may be used) may vary over time (e.g. depending on the instantaneous load in the first cell). Two pieces of network node signaling information related to the first cell may be under consideration: one set of subframes that are always available for use by the first cell (e.g. to send system information) and updated very infrequently (if at all), and one set of subframes that may be updated more dynamically to match the load in the first cell. Some form of request signaling between the two network nodes may be applicable for requesting changes in the amount of resources set aside for the first cell.

The described embodiments and their equivalents may be realized in software or hardware or a combination thereof. They may be performed by general-purpose circuits associated with or integral to a communication device, such as digital signal processors (DSP), central processing units (CPU), co-processor units, field-programmable gate arrays (FPGA) or other programmable hardware, or by specialized circuits such as for example application-specific integrated circuits (ASIC). All such forms are contemplated to be within the scope of this disclosure.

Embodiments may appear within an electronic apparatus (such as a base station or other network node) comprising circuitry/logic or performing methods according to any of the embodiments.

Figure 8:
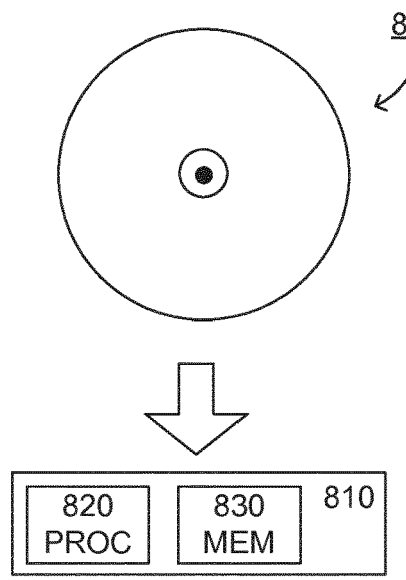
FIG. 8 is a schematic drawing illustrating a computer-readable medium according to some embodiments.

According to some embodiments, a computer program product comprises a computer readable medium such as, for example, a diskette or a CD-ROM (as illustrated by 800 in FIG. 8). The computer readable medium may have stored thereon a computer program comprising program instructions. The computer program may be loadable into a data-processing unit (PROC) 820, which may, for example, be comprised in a network node 810. When loaded into the data-processing unit 820, the computer program may be stored in a memory (MEM) 830 associated with or integral to the data-processing unit 820. According to some embodiments, the computer program may, when loaded into and run by the data-processing unit, cause the data-processing unit to execute method steps according to, for example, the methods shown in any of the FIGS. 4 and 5.

Reference has been made herein to various embodiments. However, a person skilled in the art would recognize numerous variations to the described embodiments that would still fall within the scope of the claims. For example, the method embodiments described herein describes example methods through method steps being performed in a certain order. However, it is recognized that these sequences of events may take place in another order without departing from the scope of the claims. Furthermore, some method steps may be performed in parallel even though they have been described as being performed in sequence.

In the same manner, it should be noted that in the description of embodiments, the partition of functional blocks into particular units is by no means limiting. Contrarily, these partitions are merely examples. Functional blocks described herein as one unit may be split into two or more units. In the same manner, functional blocks that are described herein as being implemented as two or more units may be implemented as a single unit without departing from the scope of the claims.

Hence, it should be understood that the details of the described embodiments are merely for illustrative purpose and by no means limiting. Instead, all variations that fall within the range of the claims are intended to be embraced therein.

The invention claimed is:

1. A method of a network node of a cellular communication system for configuring a first cell of the cellular communication system in relation to a second cell of the cellular communication system, wherein a coverage area of the first cell and a coverage area of the second cell at least partly overlap, wherein the first cell is to be provided by a first base station of the cellular communication system and has a first bandwidth, and wherein the second cell is provided by a second base station of the cellular communication system and has a second bandwidth which is larger than the first bandwidth, the method comprising:
    determining an offset between a first carrier frequency of the first cell and a second carrier frequency of the second cell, wherein a first spectrum range defined by the first carrier frequency and the first bandwidth is comprised within a second spectrum range defined by the second carrier frequency and the second bandwidth, and wherein the offset is determined such that control signaling of the second cell is aligned with control signaling of the first cell to reduce an impact of interference between the control signaling of the first cell and the control signaling of the second cell;
    configuring the first base station to provide the first cell based on the first carrier frequency;
    determining a need for data communication of the first cell during a particular time interval;
    determining a time-frequency resource to be used by the control signaling of the first cell to convey a radio resource allocation in the particular time interval for the data communication of the first cell;
    preventing the control signaling of the second cell from using the time-frequency resource; and
    transmitting the control signaling of the first cell that conveys the radio resource allocation.

2. The method of claim 1 wherein an amount of the control signaling of the second cell within the first spectrum range is defined based on a cell identity of the second cell, and wherein the offset is determined based on the cell identity of the second cell.

3. The method of claim 2 further comprising determining a cell identity of the first cell based on the cell identity of the second cell, wherein the cell identity of the first cell is determined such that an amount of the control signaling of the first cell that coincides with the control signaling of the second cell is reduced, and wherein configuring the first base station to provide the first cell is further based on the cell identity of the first cell.

4. The method of claim 1, wherein the cellular communication system is compliant with Universal Mobile Telecommunication Standard, Long Term Evolution—UMTS-LTE—and wherein the control signaling of at least one of the first cell and the second cell comprises one or more of:
    Physical Downlink Control CHannel—PDCCH;
    Physical Control Format Indicator CHannel—PCFICH
    Physical Hybrid-ARQ CHannel—PHICH; and
    Cell-specific Reference Symbols—CRS.

5. The method of claim 1 further comprising increasing a redundancy of the control signaling of the second cell.

6. The method of claim 5 wherein the redundancy is increased for the control signaling of the second cell relating to data communication of the second cell during the particular time interval.

7. The method of claim 1, wherein the first and second carrier frequencies are different.

8. A nontransitory computer readable storage medium, having thereon a computer program comprising program instructions, the computer program being loadable into a data-processing unit and adapted to cause execution of a method when the computer program is run by the data-processing unit, wherein the method is of a network node of a cellular communication system for configuring a first cell of the cellular communication system in relation to a second cell of the cellular communication system, wherein a coverage area of the first cell and a coverage area of the second cell at least partly overlap, wherein the first cell is to be provided by a first base station of the cellular communication system and has a first bandwidth, and wherein the second cell is provided by a second base station of the cellular communication system and has a second bandwidth which is larger than the first bandwidth, and wherein the method comprises:
    determining an offset between a first carrier frequency of the first cell and a second carrier frequency of the second cell, wherein a first spectrum range defined by the first carrier frequency and the first bandwidth is comprised within a second spectrum range defined by the second carrier frequency and the second bandwidth, and wherein the offset is determined such that control signaling of the second cell is aligned with control signaling of the first cell to reduce an impact of interference between the control signaling of the first cell and the control signaling of the second cell;
    configuring the first base station to provide the first cell based on the first carrier frequency;

determining a need for data communication of the first cell during a particular time interval;

determining a time-frequency resource to be used by the control signaling of the first cell to convey a radio resource allocation in the particular time interval for the data communication of the first cell;

preventing the control signaling of the second cell from using the time-frequency resource; and transmitting the control signaling of the first cell that conveys the radio resource allocation.

9. An arrangement for a network node of a cellular communication system for configuring a first cell of the cellular communication system in relation to a second cell of the cellular communication system, wherein a coverage area of the first cell and a coverage area of the second cell at least partly overlap, wherein the first cell is to be provided by a first base station of the cellular communication system and has a first bandwidth, and wherein the second cell is provided by a second base station of the cellular communication system and has a second bandwidth which is larger than the first bandwidth, the arrangement comprising:

a carrier frequency offset determiner adapted to determine an offset between a first carrier frequency of the first cell and a second carrier frequency of the second cell, wherein a first spectrum range defined by the first carrier frequency and the first bandwidth is comprised within a second spectrum range defined by the second carrier frequency and the second bandwidth, and wherein the offset is determined such that control signaling of the second cell is aligned with control signaling of the first cell to reduce an impact of interference between the control signaling of the first cell and the control signaling of the second cell;

a cell configurer adapted to configure the first base station to provide the first cell based on the first carrier frequency; and a scheduler adapted to:

determine a need for data communication of the first cell during a particular time interval;

determine a time-frequency resource to be used by the control signaling of the first cell to convey a radio resource allocation in the particular time interval for the data communication of the first cell;

prevent the control signaling of the second cell from using the time-frequency resource; and cause a transmitter of the first base station to transmit the control signaling of the first cell that conveys the radio resource allocation.

10. The arrangement of claim 9 further comprising a cell identity determiner adapted to determine a cell identity of the second cell and wherein the carrier frequency offset determiner is adapted to determine the offset based on the cell identity of the second cell which defines an amount of the control signaling of the second cell within the first spectrum range.

11. The arrangement of claim 10 wherein the cell identity determiner is further adapted to determine a cell identity of the first cell based on the cell identity of the second cell, wherein the cell identity of the first cell is determined such that an amount of the control signaling of the first cell that coincides with the control signaling of the second cell is reduced, and wherein the cell configurer is further adapted to configure the first base station to provide the first cell based on the cell identity of the first cell.

12. The arrangement of claim 9, wherein the cellular communication system is compliant with Universal Mobile Telecommunication Standard, Long Term Evolution—UMTS-LTE—and wherein the control signaling of at least one of the first cell and the second cell comprises one or more of:

Physical Downlink Control CHannel—PDCCH;
Physical Control Format Indicator CHannel—PCFICH
Physical Hybrid-ARQ CHannel—PHICH; and
Cell-specific Reference Symbols—CRS.

13. The arrangement of claim 9 wherein the scheduler is further adapted to increase a redundancy of the control signaling of the second cell.

14. The arrangement of claim 13 wherein the scheduler is adapted to increase the redundancy for the control signaling of the second cell relating to data communication of the second cell during the particular time interval.

15. The arrangement of claim 9, wherein the first and second carrier frequencies are different.

16. A network node comprising the arrangement according to claim 9.

* * * * *